US006337660B1

(12) United States Patent (10) Patent No.: US 6,337,660 B1
Esman et al. (45) Date of Patent: Jan. 8, 2002

(54) FIBER OPTIC TRUE TIME-DELAY ARRAY ANTENNA FEED SYSTEM

(75) Inventors: Ronald D. Esman, Burke; Lew Goldberg, Fairfax, both of VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/122,671

(22) Filed: Sep. 17, 1993

(51) Int. Cl.[7] .................................................. H01Q 3/22
(52) U.S. Cl. ...................................................... 342/375
(58) Field of Search ................................ 342/375, 157, 342/81, 154, 54

(56) References Cited

U.S. PATENT DOCUMENTS

| 4,216,474 A | * | 8/1980 | Levine ........................ 342/201 |
| 4,671,604 A | | 6/1987 | Soref ........................ 350/96.15 |
| 4,725,844 A | * | 2/1988 | Goodwin et al. ........... 342/374 |
| 4,814,774 A | | 3/1989 | Herezfeld ................... 342/375 |
| 4,929,956 A | | 5/1990 | Lee et al. ................... 342/376 |
| 5,041,836 A | | 8/1991 | Paschen et al. ............. 342/375 |
| 5,051,754 A | | 9/1991 | Newberg .................... 342/375 |
| 5,117,239 A | * | 5/1992 | Rita ............................ 342/375 |
| 5,333,000 A | * | 7/1994 | Hietala et al. .............. 342/368 |
| 5,339,087 A | * | 8/1994 | Minarik ....................... 342/375 |

OTHER PUBLICATIONS

Esman et al., "Fiber-Optic Prism True Time–Delay Antenna Feed", *IEEE Photonics Tech. Ltrs.*, PTL–5, pp. 1347–1349, Jul. 1993.

Esman et al., "Two Optical–Control Techniques for Phased Array: Interferometric and Dispersive–Fiber True Time Delay", *Proc. SPIE*, vol. 1958, pp. 133–143, Apr. 1993.

Johnson et al., "*Antenna Engineering Handbook*", Chapter 20, Phased Arrays, pp. 20–1–20–67, McGraw–Hill, New York, NY 1984.

Duling et al., "Single–Polarization Fibre Amplifier", Elect. Ltrs., vol. 28, No. 12, pp. 1126–1128, Jun. 92.

Koepf, "Optical Processor for Phased–Array Antenna Beam Formation", SPIE vol. 477, OP. Tech. for Microwave Appl., pp 75–81, 1984.

Esman et al., "Microwave True Time–Delay Modulator Using Fibre–Optic Dispersion", Elect. Ltrs., vol. 28, pp. 1905–1907, 1992.

Ng. et al., "The First Demonstration of an Optically Steered Microwave Phased Array Antenna Using True–Time–Delay", J. Ltwv. Tech., vol. 9, No. 9, pp. 1124–1131, Sep. 91.

Stillwell et al., "Fiber Optic Feed", NRL Memo Rpt. 6741, Nov. 90.

Toughlian et al., "A Photonic Variable RF Delay Line for Phased Array Antennas", J. Ltwv. Tech., vol. 8, No. 12, pp. 1824–1828, Dec. 90.

* cited by examiner

*Primary Examiner*—Dao Phan
(74) *Attorney, Agent, or Firm*—John J. Karasek; John G. Mills

(57) ABSTRACT

The fiber-optic true time-delay array antenna feed is a device for dynamically generating a plurality of identical electromagnetic radiation (EMR) signals with continuously variable time-delay separations. The EMR signal to be transmitted modulates a continuous-wave optical signal from a laser source which is applied to a plurality of high dispersion single-mode optical fibers acting as synchronized true timedelay modulators forming an array antenna feed system. Each fiber is chosen to have the same nominal time delay but a different net dispersion. Photodetectors convert the optical intensity back into an EMR electrical signal to feed each of the elements of the array antenna.

51 Claims, 8 Drawing Sheets

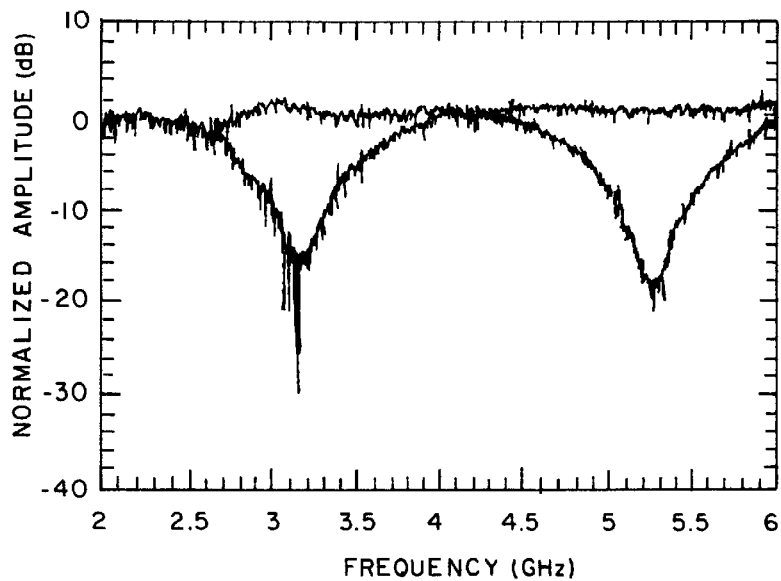
FIG. 1a
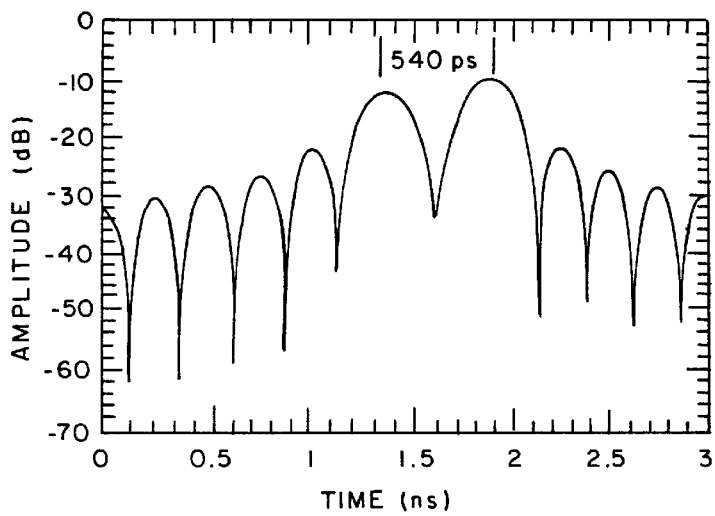
FIG. 1b(1)
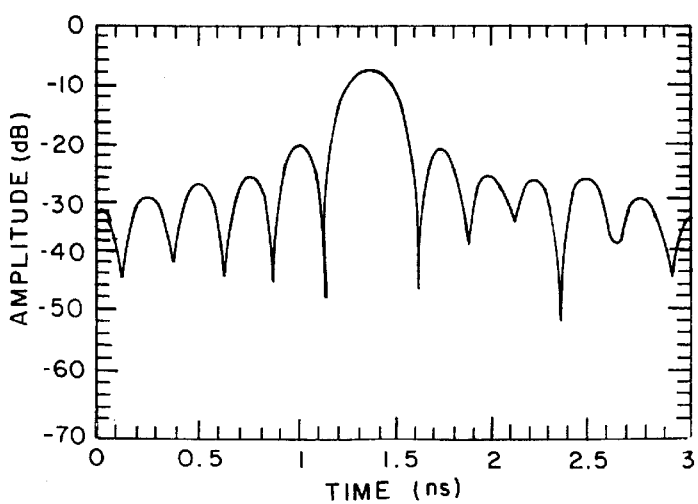
FIG. 1b(2)

FIBER OPTIC TRUE TIME-DELAY ARRAY ANTENNA FEED SYSTEM

BACKGROUND OF THE INVENTION

1. Field of the Invention

This invention generally relates to an array antenna system for directing and receiving electromagnetic energy and particularly to a fiber optic true time-delay array antenna feed system.

2. Description of the Related Art

An antenna array is a stationary group of individual radiating (and collecting) elements that collectively form electronically steerable transmit (or receive) beams. The electromagnetic radiation (EMR) signal driving (and received by) each element is identical to (from) each other element except for the relative time delays present. Despite their wide use in various applications, phased array antenna systems suffer from several drawbacks. First, routing numerous conventional coaxial or waveguide transmission lines is unwieldy, heavy, expensive and lossy. These implementation difficulties have led to various different optical schemes for phase control, which offer small size and weight, large bandwidths, low loss, low crosstalk and immunity from electromagnetic interference (EMI). Second, phased array antenna system performance deteriorates as the signal bandwidth increases. For example, wide bandwidth operation (e.g., narrow pulse or frequency swept) results in antenna gain reduction and in undesirable beam distortions ("beam squinting") characterized by beam steering with frequency.

Time-delay modulators are required to allow wide instantaneous bandwidth operation but the difficulty in implementing time-delay modulators has precluded array realization, especially for large aperture, numerous-element arrays now desired for high resolution and high antenna gain. Instead, current phased array antennas comprise antenna elements having identical radio frequency (RF) signals except for relative phase, which is limited to 0 to $2\pi$ radians. That is, relative time delays are limited to one period of the radio frequency being used.

Nevertheless, some time-delay techniques have been proposed. The technique of electromechanical optical fiber stretching is shown in U.S. Pat. No. 4,814,774, Herczfeld (1989). Here time delays are introduced into the signal delivered to each antenna element by stretching the fiber-optic link feeding each element. However, to produce significant time delays ($\sim$1 ns) while avoiding fiber breakage, long fiber lengths are required and so large stretching forces (piezo-electric cylinders) are required. Large piezos are fragile, require high voltages and have limited speed of response.

In Toughlian et al., A Photonic Variable RF Delay Line for Phased Array Antennas, IEEE J. Lightwave Tech., LT-8, pp. 1824–1828, 1990, Toughlian and Zmuda utilize integrated-optic frequency shifting and diffraction gratings to generate an optical modulated carrier that is steered and delayed according to the radio frequency. This technique relies on complex tight-tolerance bulk optics that tend to be less rugged. Also, the true-time-delay performance has limited bandwidth.

An acousto-optic diffraction scheme proposed and demonstrated in the report Stilwell et al., *Fiber Optic Feed*, Naval Research Laboratory Memorandum Report 6741, Nov. 6, 1990, uses optically-sampled acousto-optic diffracted interference beams to generate multiple phase-correlated signals to drive antenna elements. However, this optical heterodyne system tends to have narrow instantaneous bandwidth and relies on tight-tolerance bulk optics.

Various different switching schemes involving switching in and out or selecting various different discrete fiber-optic delays have been proposed. Ng et al., The First Demonstration of an Optically Steered Microwave Phased Array Antenna Using True Time-Delay, IEEE J. of Lightwave Tech., 9, pp. 1124–1131, 1991 and U.S. Pat. No. 5,051,754, Newberg (1989) have taught true time-delay array steering by switching on and off laser diode driving various different lengths of fiber all combined together to a single photodetector (feeding an array element). Also, integrated-optic spatial light modulators and fiber-optic cross-bar switches have been suggested for use with an array of various lengths of optical waveguides. All of these approaches have limited utility because they give only discrete time delays, are component and control signal intensive (still requiring electronic phase shifters), and have large losses associated with large fanout needed to approximate a continuously variable time delay.

A wavelength dependent, tunable, optical delay system for selectively varying the wavelength of optical light is described in U.S. Pat. No. 4,671,604, Soref. Utilizing a plurality of wavelength filter combinations or cleaved-coupled-cavity ($C^3$) lasers, the wavelength of the optical signal entering the fiber can be varied over a preselected wavelength band by selectively varying the wavelength of the optical signal. However, to effectively and accurately delay the optical signal, the output of all lasers and the wavelength of all tunable filters must be changed equally and simultaneously. The device in Soref is, thus, complicated to operate and has many expensive components. Further, Soref specifies direct RF modulation of the optical source, which results in an interaction between the RF signal and the wavelength control signal.

SUMMARY OF THE INVENTION

The object of this invention is to provide a device for dynamically generating a plurality of identical signals with correlated, continuously variable, relative true time-delays for array antennas operating in the radio-frequency, microwave and millimeter wavebands.

A further object of this invention is to provide an apparatus having wideband characteristics for generating true physical time-delay that produces a frequency-dependent phase shift.

Another object is to provide an apparatus in which the control is accomplished by means of a low voltage signal (0–10 volts) signal which tunes the wavelength of the laser source.

Another object is to provide an apparatus suitable for feeding a one- or two-dimensional array in a transmit and/or receive operational mode.

Another object is to provide an apparatus capable of forming a plurality of independently steered beams each containing different electrical signals directed towards different operational objectives.

Another object is to provide an apparatus having no moving parts and does not use optically coherent techniques that require optical beam alignments having strict tolerances to the dimensions of the optical wave.

Another object of this invention is to provide optical antenna feed signals that avoid interaction between the signal to be transmitted (or received) and the delay control signal (i.e., the wavelength of the optical source).

Another object of this invention is to provide array antenna feed signals that completely eliminate the need for phase shifters and complex control signal distribution systems.

The fiber-optic true time-delay array antenna feed is a device for generating a plurality of identical electromagnetic radiation (EMR) signals with continuously variable and correlated time-delay separations. The EMR signal to be transmitted modulates a continuous-wave optical signal from a continuously-tunable narrow-linewidth (laser) source, which is applied to a plurality of high dispersion single-mode optical fibers acting as synchronized true time-delay modulators forming an antenna feed system. Each fiber is chosen to have a different net dispersion. Photodetectors convert the optical intensity back into an EMR electrical signal feeding each of the elements or subarrays of the array antenna.

BRIEF DESCRIPTION OF THE DRAWINGS

FIG. 1a is a plot of frequency-domain interference indicating antenna position off broadside and unequal delays, and flat spectrum and delay equalization.

FIG. 1b(1) is a plot of time-domain data showing two time-separated pulses from individual antenna elements.

FIG. 1b(2) is a plot of time-domain data showing overlaping pulses from individual antenna elements.

DESCRIPTION OF THE PREFERRED EMBODIMENTS

Figure 1:
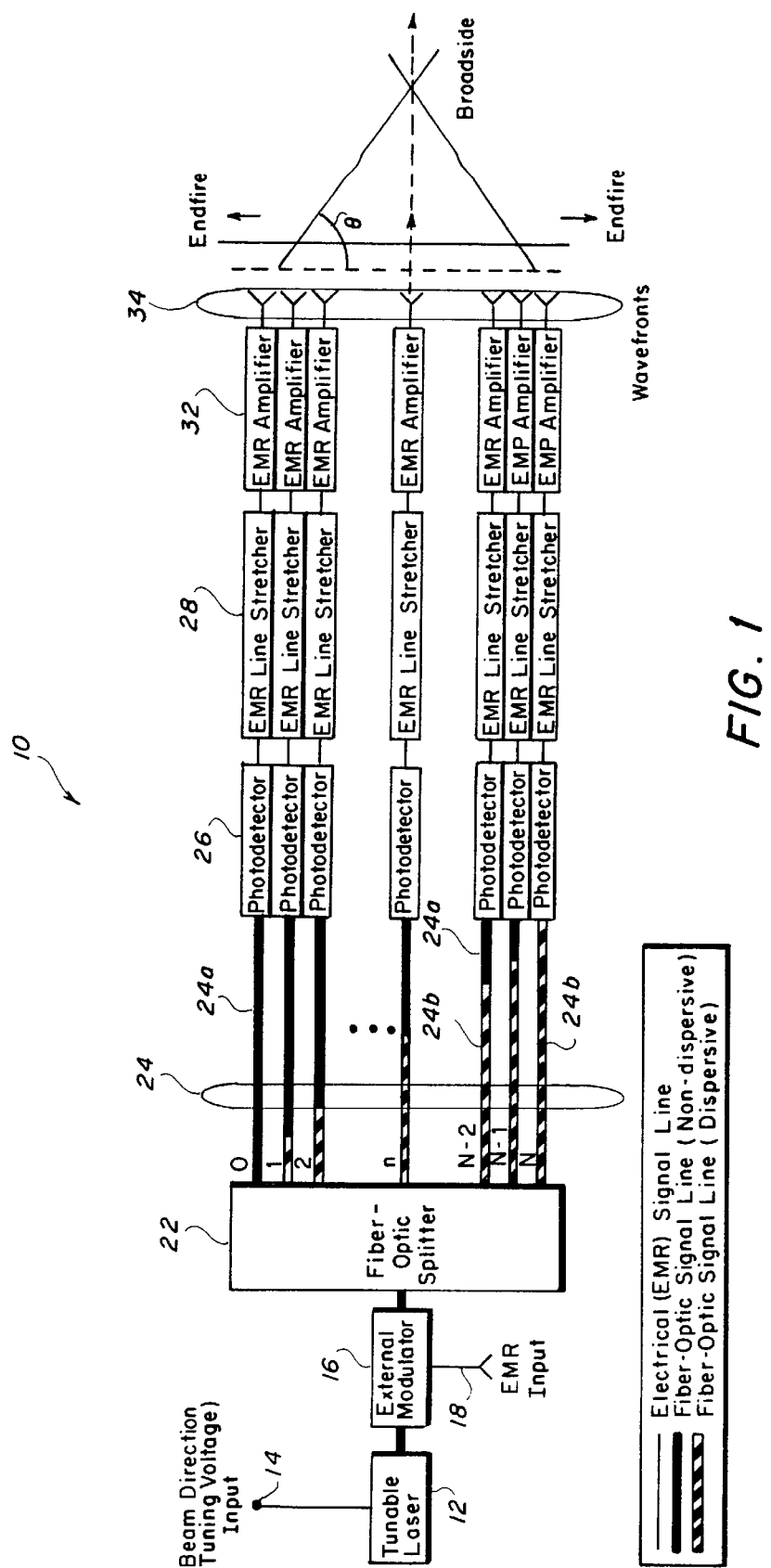
FIG. 1 is a schematic of the fiber-optic true time-delay array antenna feed utilizing a wavelength tunable optical carrier that can be modulated and a multiple of synchronized true time-delay modulators.

The preferred embodiment of the fiber optic true time-delay array antenna feed 10, FIG. 1, is a device for generating a plurality of radio frequency (RF), microwave, and millimeter wave signals (collectively referred to as electromagnetic radiation (EMR) having the proper relative time delays suitable for wide-bandwidth, wide aperture, numerous-element, beamforming antenna systems. For convenience, EMR 18 is used herein to represent signals containing all frequencies of interest for antenna array feeds namely RF from ~1 kHz to 1 GHz, microwaves from 1 GHz to 30 GHz and millimeter waves from 30 GHz to >300 GHz. The EMR input may consist of many types of signals, including radar, communications, jamming, etc. Relative time delays are derived from superimposing the EMR 18 on a wavelength-controlled optical carrier generated by a tunable laser 12 and splitting the resultant modulated optical signal with a fiber-optic splitter 22 into a plurality of optical fibers 24 each having slightly different dispersion. Dispersion refers to the wavelength dependence of the index of refraction or equivalently wavelength dependence of the velocity of the optical signal. Each fiber having a different dispersion (i.e., optical time delay per unit change in wavelength per unit of fiber length), implies that a change in the optical wavelength results in differing amounts of delay change in each fiber, such differences in amounts of delay change being required for array antenna beamforming and steering. Antenna beam direction will be determined by the optical wavelength which can be rapidly scanned electronically. Multiple optical signals are used to incorporate beam shaping and nulling, and multibeam operations.

A wavelength-tunable modulated laser source 15, having a laser 12 (preferably a sigma laser as described in the paper by Duling et al., Single-Polarisation Fibre Amplifiers, Elec. Ltrs., Vol. 28 No. 12, pp. 1126–1128, Jun. 4, 1992, which is hereby incorporated by reference) operating at near an attenuation minimum in the optical fiber 24 (1300 or 1550 nm). The required tunability of the laser 12 is governed by the dispersion of the optical fiber 24 to be used, the amount of variable delay needed, and the maximum tolerable length of fiber 24. The sigma laser described by Duling is preferred since it offers wide (>50 nm) tunability, narrow spectral linewidth (<0.06 nm), and effective continuous tuning. Wide tunability maximizes the variable delay per unit fiber length while narrow spectral width is required to minimize wavelength and time delay uncertainty. Effective continuous tuning implies there are no wavelength jumps during tuning, which are observed in $C^3$ lasers and cause corresponding undesirable discrete time delay jumps.

The wavelength-tunable optical carrier output may be modulated within the laser 12. However, since direct modulation typically effects the laser wavelength and since the wavelength tunability and millimeter wave modulation capabilities are difficult to achieve simultaneously in a single laser, an external modulator 16 with an applied EMR input 18 is preferable. The EMR input 18 modulates the optical carrier output of the wavelength-tunable laser source 12. However, the EMR input 18 may be comprised of a plurality of EMR sources combined by a power combiner (not shown). In the simplest arrangement, the external modulator 16 is an intensity modulator, such as a Mach-Zehnder integrated-optic intensity modulator (i.e., manufacturer's part no. MZM-1.5-18-00-03, manufactured by United Technologies Photonics of Bloomfield, Conn.; other suitable wideband modulators capable of operating to 20 GHz and beyond are available from GEC-Marconi Materials Technology, Ltd., Northants, UK; AT&T Microelectronics, Allentown, Pa.; and the Naval Research Laboratory, Washington, D.C.). Note that since the delay is acting on the optical carrier, the same differential delay will be experienced independent of modulation format (optical frequency, optical phase, etc.). Also the EMR signal 18 can directly modulate the tunable laser 12 through the use of such devices as a tunable laser diode.

The modulated optical signal output from the external modulator 16 is applied to a fiber optic splitter 22 (i.e., manufacturers part no. STU-15-8-A-1-2B, manufactured by Aster of Hopkinton, Mass.) wherein it is divided into a plurality of optical-fiber paths 24. The EMR-modulated optical signal is split into N optical fibers 24 and propagates along each optical fiber 24 at a velocity determined by the wavelength, $\lambda$, of the tunable laser source 12 and by the wavelength-dependent group velocity of the optical fiber 24. Each of the optical fibers 24 is chosen to have a different net dispersion by either intrinsic differences or, preferably, by connecting an appropriate length of dispersive 24b and non-dispersive 24a optical fiber. The preferred optical path is one as described in the U.S. patent application entitled Fiber-Optic True Time-Delay Modulator, application Ser. No. 08/102,934, filed Aug. 6, 1993, which is hereby incorporated by reference.

At the end of each optical fiber 24, an associated one of N photodetectors 26 (e.g., manufacturers part no.PDC 4310, manufactured by BT & D technologies of Wilmington, Del.) converts the optical intensity back into an EMR electrical signal which, after possible trimming of the electrical length in a line stretcher 28 and amplification by EMR amplifier 32 if desired, is applied to each of N array elements 34 for transmission.

The nominal optical delay, $\tau_0$, (when $\lambda - \lambda_0 = \Delta\lambda = 0$, where $\lambda_0$ is the wavelength near the center of the tunable laser 12 wavelength tuning range to be utilized) of the link of the non-dispersive 24a and dispersive 24b optical fiber 24 is written $$\tau_o = \frac{l_{Dn}}{V_{gD}} + \frac{l_{on}}{V_{go}} = \frac{L}{V_{gD}}$$

where $l_{Dn}$ and $l_{on}$ are the length of the dispersive 24b and non-dispersive 24a optical fiber 24, respectively, for array element n 34; $V_{gD}$ and $V_{gO}$ is the group velocity of the dispersive 24b and non-dispersive 24a optical fibers 24, respectively, at wavelength $\lambda_0$; and L is the length of the dispersive fiber 24b in array element N 34. For a linear array example we choose $l_D = Ln/N$ and $l_{on} = L[(N-n)/N](V_{go}/V_{gD})$, which means the time delay is equal for all elements at $\lambda_0$.

Non-dispersive optical fiber 24 a refers to an optical fiber with low dispersion, that is preferably less than ±1 ps/km·nm. For illustrative purposes in the following equation, the dispersion, D, is set to zero for conceptual convenience. The magnitude of the dispersion (positive or negative) of the dispersive optical fiber 24b should be greater than D=15 ps/km·m and is preferably greater than 100 ps/km·m, with the upper limit set by manufacturing producibility and the lower limit set only by the desire to limit the overall length (delay) of the optical fiber feed 24. Since only the lengths $l_{Dn}$ are chosen to have dispersion D, the time delay, $\tau_n$, in each link can be written as $$\tau_n = \frac{l_{Dn}}{V_{gD}} + \frac{l_{On}}{V_{gO}} = \tau_O + D \cdot l_{Dn} \cdot \Delta\lambda$$

so that the relative time delay to the array element n 34 is $$\Delta\tau_{nO} = \tau_n - \tau_O = D \cdot l_{Dn} \cdot \Delta\lambda = DL\Delta\lambda n/N$$

and the delay between two adjacent array elements 34 is In this linear array example the relative delay between adjacent $$\Delta\tau = \tau_{n+1} - \tau_n = \frac{D \cdot L \cdot \Delta\lambda}{N}$$

array elements 34 is equal and by tuning the wavelength can be set to correspond to the beam angle of interest. That is $$\Delta\tau = \frac{\Delta \sin(\Theta)}{V} = \frac{D \cdot L \cdot \Delta\lambda}{N}$$

when $\Lambda$ is the element spacing, the adjacent element time delay is and the beam pointing direction is given by $$\Theta = \sin^{-1}\left(\frac{D \cdot L \cdot c \cdot \Delta\lambda}{A}\right)$$

where the speed of light in a vacuum, c, is taken as the transmitted EMR velocity and A is the array antenna 34 aperture width, $A = N\Lambda$. A key point to note is that the equation for the beam pointing direction is independent of EMR frequency, thus "beam squint" is eliminated, antenna gain remains constant with frequency and wide instantaneous bandwidth is achieved.

The lengths of non-dispersive optical fibers 24a are set to $$l_{On} = \frac{(N-n)}{N}\left(\frac{V_{gO}}{V_{gD}}\right)L$$

so that the delays from the fiber-optic splitter 22 to the photodetector 26, $\tau_O$, are all the same and the electrical delays from photodetector 26 to the array antenna element 34 are also selected to be the same. Although not necessary, this choice of lengths is preferred since any electrical dispersion (frequency-dependent velocity of the electrical EMR signals) existing between photodetector 26 and array element 34 would be equalized. Also, equal lengths of non-dispersive optical fiber 24 a could be added to each link to allow for remoting of the antenna from the antenna control unit 14, tunable laser 12, external modulator 16, etc. It is also noted that the linear proportionality between elements is only advantageous when a filled linear array is utilized. Clearly, for a sparsely populated array or non-flat surfaces, the dispersion relationship between elements is different but nevertheless is straightforward to those individuals knowledgeable in the art.

The total time delay of each element 34 is determined by the optical delay from the external modulator 16 to the photodetector 26 and the electrical delay from the photodetector 26 to array element 34. Utilization of EMR line stretchers 28 (e.g., manufacturer's part no. 6705K-2, manufactured by Sage Microwave of Natick, Mass.) to equalize the electrical time delays are of technical convenience and are not essential to the basic concept.

The following example describes fiber optic true time-delay array antenna feed of the type shown in FIG. 1, but specific components, materials, device and/or operating parameters are provided by way of illustration only and, unless otherwise indicated, are not intended to limit the scope of the invention.

A two-element antenna system was built and demonstrated on a compact radar range inside an anechoic chamber. The system was comprised of a sigma ($\sigma$)-laser source with a voltage wavelength control, a travelling-wave 18 GHz electrooptic RF modulator, and a 50/50 fiberoptic beam splitter feeding two optical links. One of the optical links was a 108-m section of high dispersion fiber (D=−100 ps/km·nm), and the other was a similar-length section of single-mode dispersion-shifted fiber (D=0 ps/km·nm). The fiber links were trimmed to have nominally identical lengths and were coupled to InGaAs PIN photodetectors with a bandwidth of ~6 GHz. The photodetectors were attached, through bias networks, directly to the feeds of high-bandwidth horn antennas. The horn antennas were separated by ~72Δ. An RF mirror focused the radiated signals onto a receiver element placed in its focal plane. A vector network analyzer (VNA) was used to drive the RF modulator and to measure the signal from the receiver. This configuration allowed simultaneous amplitude and phase measurements to be performed.

Several tests were carried out to demonstrate the antenna performance. First, the laser wavelength was adjusted to the shortest wavelength limit and the antenna was aligned broadside. A nearly flat microwave spectrum was observed for the received signal from 2 to 6 GHz with a residual ripple due to the frequency characteristics of individual microwave elements in the system. This ripple was calibrated out on the VNA resulting in a perfectly flat spectrum response over the 4 GHz bandwidth.

The antenna was then mechanically rotated by ~5° and an interference pattern, shown as line a in FIG. 1a, appeared in the frequency domain. Such a pattern is a direct indication of an unequal time delay for RF signals from each antenna element, which causes the relative phase between them to vary with $\omega_m$. The spacing between the nulls is given as $\Delta f_{null} = 1/\tau$. So, from this pattern we compute a relative delay difference of $\tau \sim 480$ ps. The laser wavelength was then increased until the interference pattern was completely eliminated, shown as line b in FIG. 1a, thereby indicating complete delay equalization. The small observed ripple can be attributed to a residual wavelength dependence of the amplitude response of optical elements.

In addition to the amplitude spectrum, the VNA measures relative phase, which can be used with the VNA Fourier transform capabilities to obtain time-domain information from frequency-domain measurements. FIG. 1b(1) shows the transform of the frequency-domain data shown by line a of FIG. 1a. Two distinct pulses resulting from the time-delay difference between the signals from each radiating element are immediately observed. The same Fourier-transform procedure was applied to the signal corresponding to the frequency-domain data shown by line b in FIG. 1a with the result shown in FIG. 1b(2). Both pulses merge into a single pulse, indicating that the time-delays are now equalized. Note, only one of the pulses actually shifts its position in time. This is due to the fact that only one of the fiber-optic links has an high-dispersion fiber. The other link has a nondispersive fiber and its propagation delay is therefore wavelength independent. The 3 dB width of the main pulse is 2.2 ns, corresponding to a 4 GHz bandwidth.

Figure 1C:
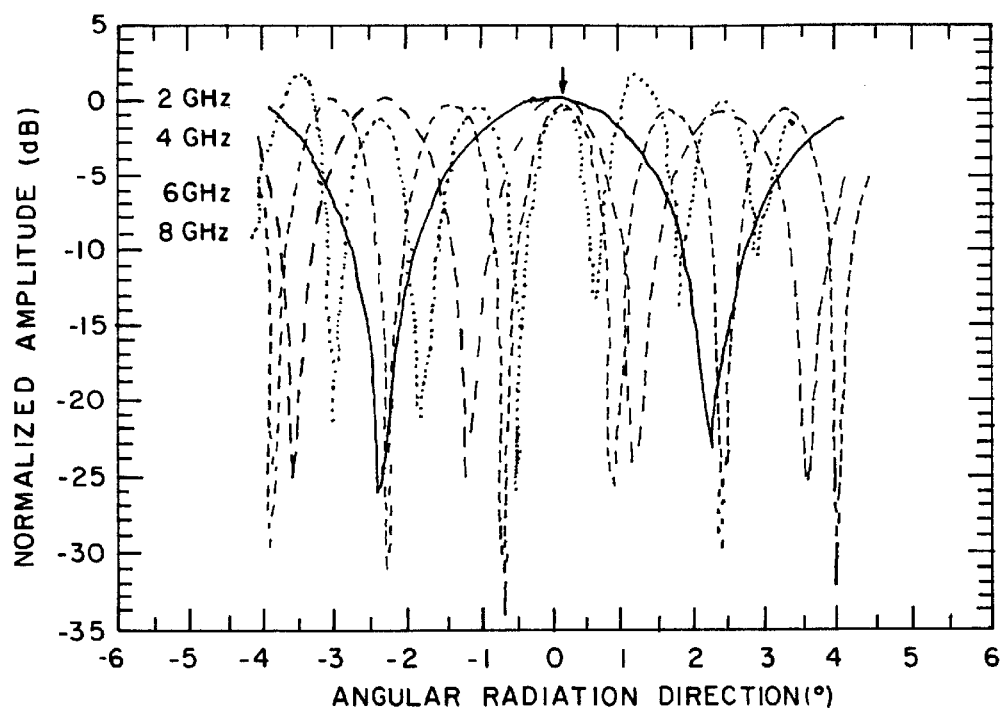
FIG. 1c is a plot of detected signal as a function of antenna mechanical rotation angle showing main radiation lobe at broadside.

Direct wideband beam steering by wavelength control of the laser is also demonstrated. The antenna is initially adjusted for broadside radiation at $\lambda_0 \sim 1550$ nm and an RF signal is applied to the external modulator. Then, keeping the wavelength constant, the antenna is mechanically rotated. The corresponding detected signal as a function of the rotation angle is shown in FIG. 1c. We observe that the main lobe position which indicates the radiation direction is fixed at the antenna angle $\theta \sim 0°$ (i.e. broadside) and is independent of the RF modulating frequency over from 2 to 8 GHz.

Figure 1D:
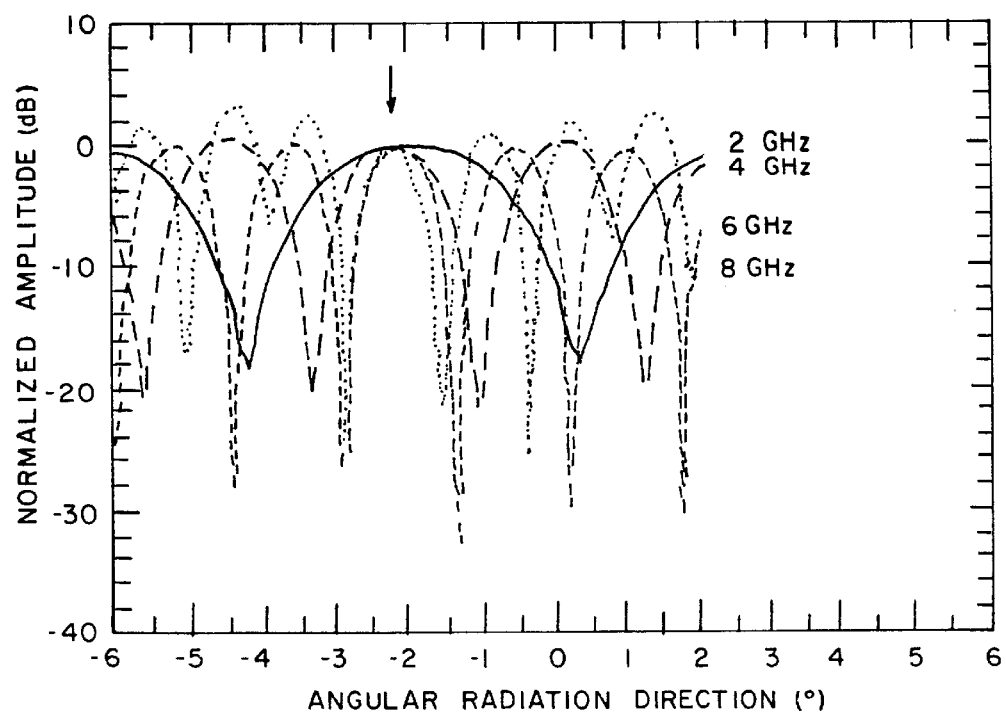
FIG. 1d is a plot of detected signal as a function of antenna mechanical rotation angle showing main radiation lobe at −2.20.
Figure 1E:
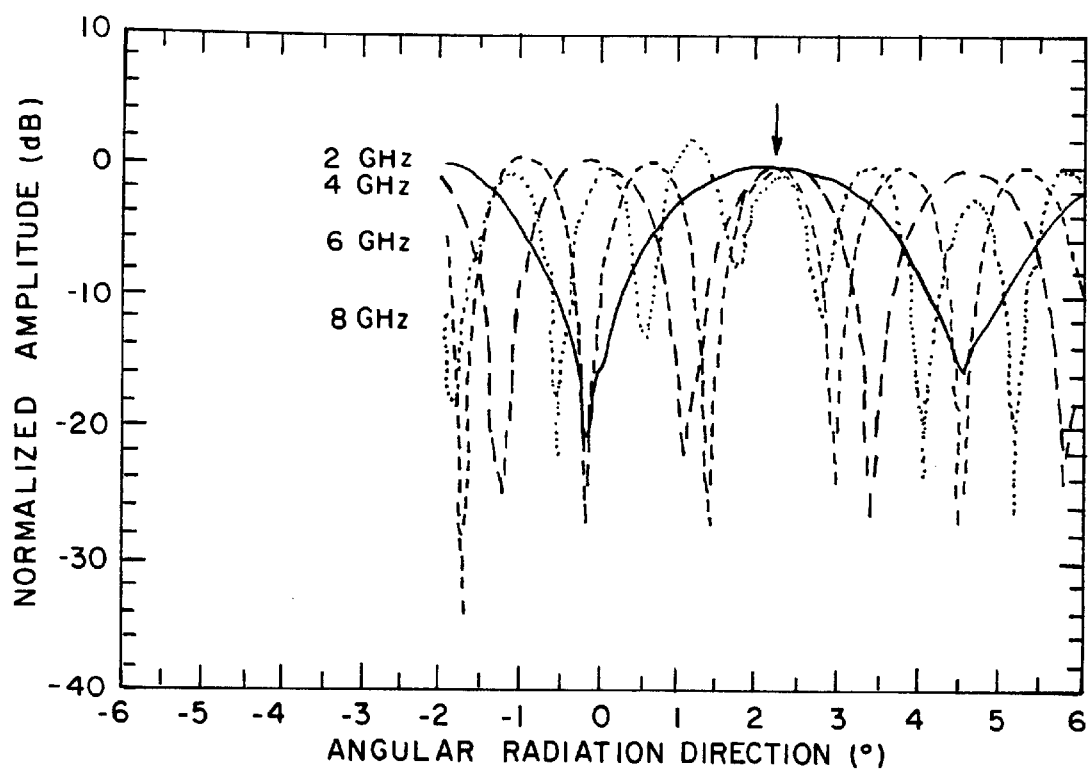
FIG. 1e is a plot of detected signal as a function of antenna mechanical rotation angle showing main radiation lobe at 2.20.

Steering of the antenna beam angle is demonstrated when the laser wavelength is reduced ($\lambda < \lambda_0$) while keeping all the other parameters the same. FIG. 1d shows the signal detected as a function of mechanical antenna rotation angle, and the main lobe now appears at $\sim -2.2°$. Similarly, by increasing the wavelength ($\lambda > \lambda_0$)) the beam is steered to negative angles and the main radiation lobe now appears at $\sim 2.2°$ on the mechanical antenna rotation axis (see FIG. 1e). The main lobe position is again independent of frequency in the range of 2 to 8 GHz directly demonstrating a two-octave bandwidth of the antenna, not possible with conventional phased array antennas. The actual steering angle is a function of net dispersion difference between individual fiber links, of optical carrier wavelength, and of antenna element separation; but it is not a function of the RF modulating frequency. In these measurements the sidelobes have the same magnitude as the main one. This is purely a result of the system consisting of only two elements, which results in a sinusoidal interference pattern, and does not detract from elucidating the main operating principles.

Figure 1F:
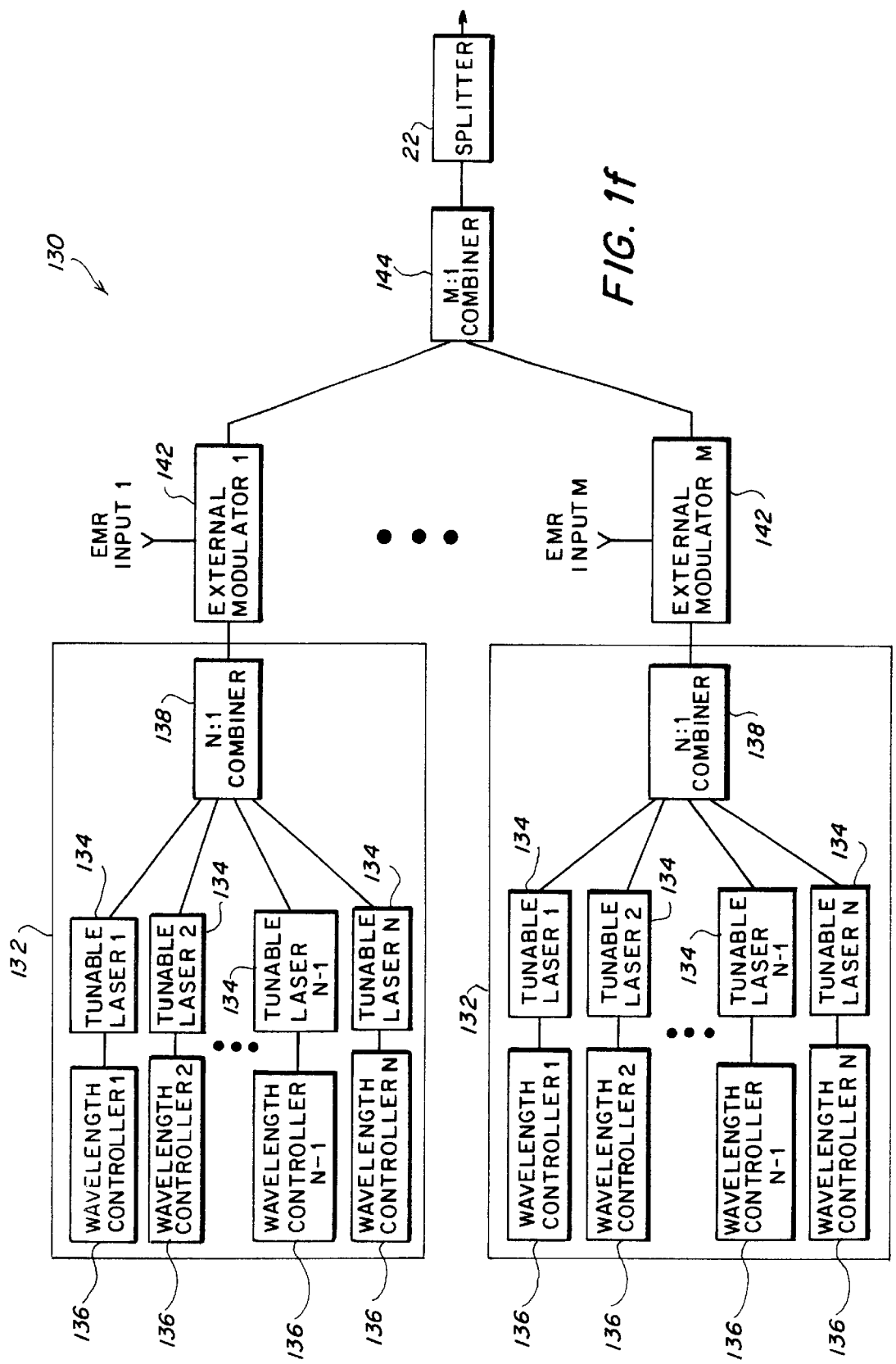
FIG. 1f is a schematic showing multi-beam and multiple-frequency modulated optical source.

Multiple antenna beams may be generated by combining outputs of many lasers to form the optical input to an external modulator. In another preferred embodiment 130, FIG. 1f, the modulated optical source 15 of FIG. 1, is replaced by a complex modulated optical source 130. The modulated optical source 130 is comprised of a plurality of laser optical sources 132 each having a plurality of continuously tunable lasers 134 with single wavelength outputs. Each laser 134 is respectively controlled by a separate wavelength controller 136 producing a plurality of optical carriers having narrow spectral width, which are combined in a combiner 138 (e.g., manufacturer's part no. UU-15-17-A-1-D, manufactured by Aster Corp. of Milford, Mass.). The controller 136 may be either a constant voltage power supply, electrical signal generator, digital-to-analog converter, or any electrical circuit capable of producing complex electrical waveforms. Combiner 134 integrates the plurality of optical carriers and applies the output to an external modulator 142. The plurality of outputs from the external modulators 142 of the plurality of laser sources 132 are combined in a combiner 144 that integrates the plurality of modulated optical signals into a single complex -optical signal which is applied to fiber optic splitter 22 in FIG. 1. After the complex optical signal is applied to the splitter 22, the operation of the system is as previously described in the first embodiment 10, except that now there are several superpositions of electrical output signals fed to each element of the array, each signal and associated delay corresponds to an antenna beam that is independently modulated and independently steered. Note that the combination and splitting of optical signals is possible in a single device called a fiber-optic star coupler.

Figure 2:
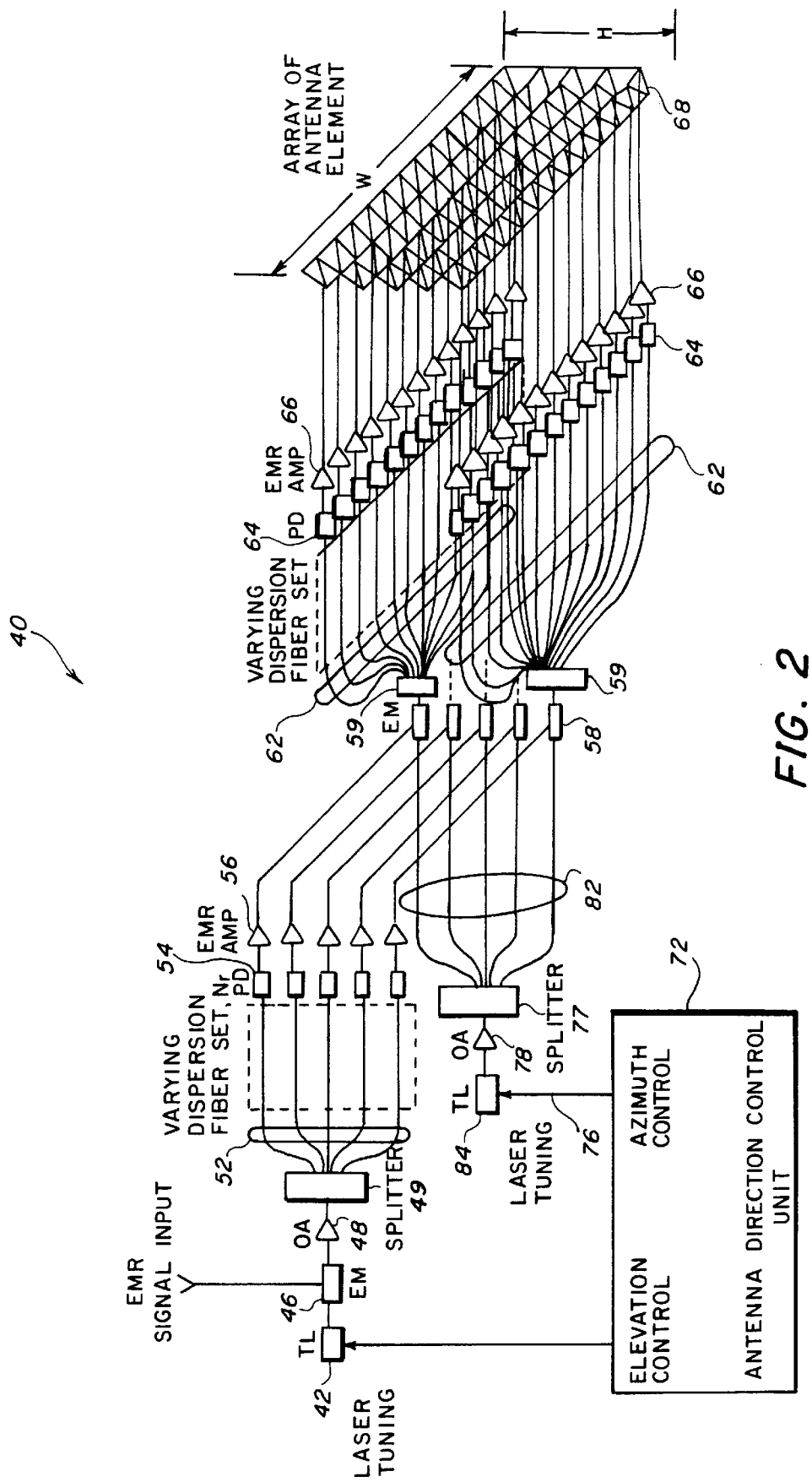
FIG. 2 is a schematic of the fiber-optic true time-delay array antenna feed for a 5×13 two-dimensional array antenna system.

In another preferred embodiment 40 the invention is adapted for two-dimensional antennas. FIG. 2 is a schematic of the configuration for a 5×13 two-dimensional array 40. An antenna direction control unit 72 (e.g., two independent voltage sources) applies an elevation control signal to a first tunable laser (TL) 42 which produces an elevation-controlled tunable optical carrier that is modulated in a first external modulator (EM) 46 by an applied EMR signal input 44. The modulated output of the external modulator 46 passes through an optical amplifier (OA) 48 (e.g., manufacturer's part no. EFA1400-1550, manufactured by BT&D Technologies of Wilmington, Del.) which provides optical amplification mainly to overcome splitting losses. The modulated optical signal is then split by fiber splitter 49 so as to feed each of a plurality of rows (in this embodiment five) of varying dispersion optical fibers 52 where the plurality of optical signals are delayed. The plurality of delayed modulated optical signals are respectively detected by a plurality of photodetectors 54, amplified respectively by a plurality of EMR amplifiers 56 (e.g., manufacturer's part no. AWT-18637, manufactured by Avantek of Santa Clara, Calif.). The amplified outputs of the EMR amplifiers 56 are respectively applied to a plurality of second external modulators 58.

The antenna direction control unit 72 applies an azimuth control signal to a second tunable laser (TL) 84 which produces an azimuth-controlled optical carrier which is applied to a second optical amplifier (OA) 78. In the second optical amplifier (OA) 78, the optical carrier is amplified and then separated by a fiber optic splitter 77 into a plurality of identical-wavelength optical carriers (in this embodiment five) and applied respectively to the plurality of second external modulators 58. The plurality of identical-wavelength azimuth-controlled optical carriers from the respective plurality of second optical modulators 78 are respectively modulated by the plurality of elevation-controlled electrical signals from the EMR amplifiers 56 respectively in the plurality of second external modulators 58. The respective outputs of the plurality modulators 58 are each respectively split by a plurality of fiber optic splitters 59 to feed a plurality of columns (in this embodiment thirteen) and respectively applied to a plurality of photodetectors 64 where the respective modulated optical signals are converted into electrical signals. The electrical signals from the plurality of photodetectors 64 are respectively applied through a plurality of second EMR amplifiers 66 to a plurality of antenna elements 68.

By analogy to the one-dimensional case, the time delay to the element at column n of the output of external modulator 58, selectively called row m, is given by $$\Delta\tau_{nm} = \frac{D \cdot L_r \cdot \Delta\lambda_r}{N_r} + \frac{D \cdot L_c \cdot \Delta\lambda_c}{N_c}$$

and the elevation and azimuthal angles, $\Theta_e$ and $\Theta_a$, are given by $$\Theta_e = \text{Sin}^{-1}\left(\frac{D \cdot L_r \cdot c \cdot \Delta\lambda_r}{H}\right)$$

and $$\Theta_a = \text{Sin}^{-1}\left(\frac{D \cdot L_c \cdot c \cdot \Delta\lambda_c}{W}\right)$$

where $N_r$ and $N_c$ are the number of rows and columns, respectively; $L_r$ and $L_c$ are the lengths of the varying dispersive fibers 62 to row $N_r$ and column $N_c$, respectively; $\Delta\lambda_r$ and $\Delta\lambda_c$ are the controlled wavelengths for elevation and azimuth, respectively; and H and W are the aperture height and width, respectively.

Figure 3:
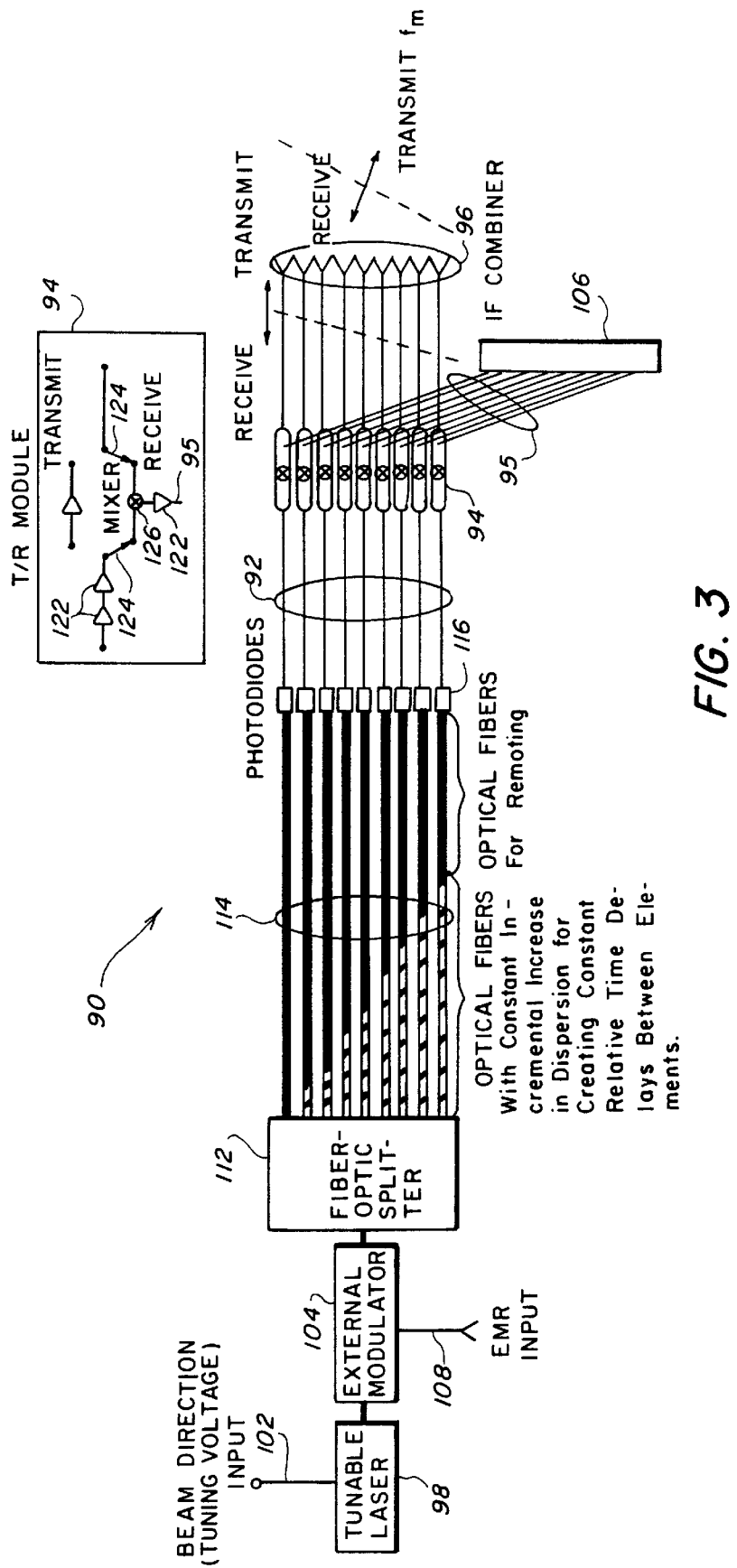
FIG. 3 is a schematic of a fiber-optic true time-delay array antenna feed showing an overall system architecture of the receive and transmit operation.
Figure 4:
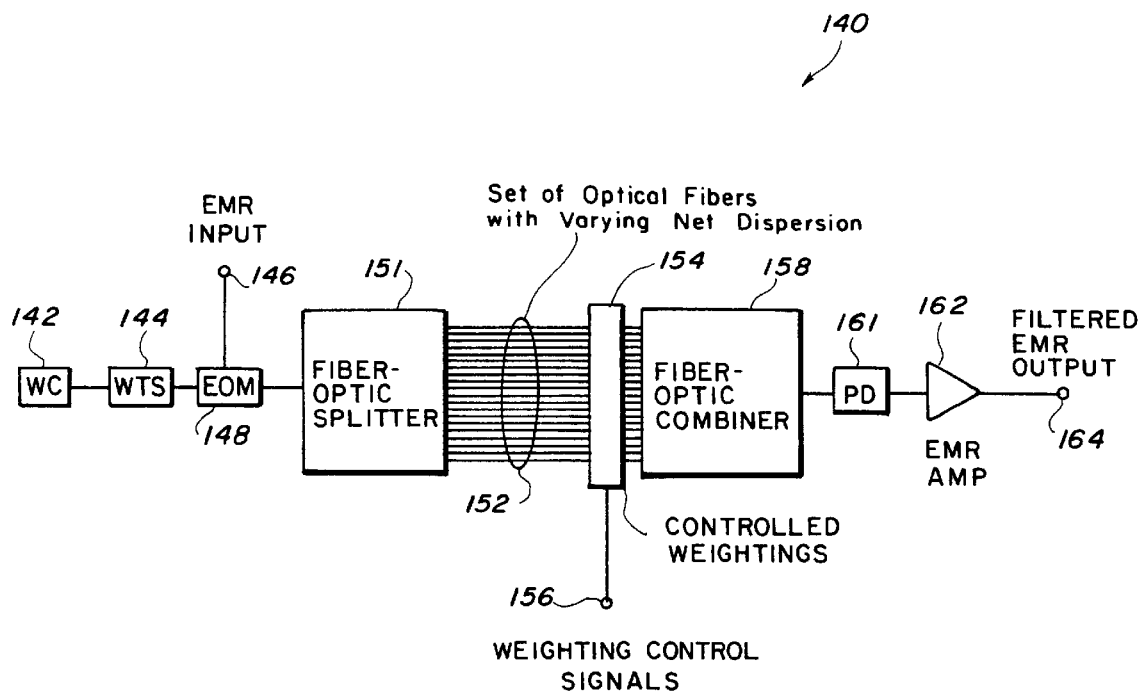
FIG. 4 is a schematic of a fiber optic finite impulse response filter.

In a third preferred embodiment, as shown by FIG. 3, the invention is applied to a system that is capable of both transmit and received modes of operation. A tuning voltage input 102 determines the beam direction and is applied to a tunable laser 98 which generates an optical carrier that is applied to an external modulator 104. In the external modulator 104 an EMR input signal 108 modulates the optical carrier which is applied to a fiber-optic splitter 112. In the fiber optic splitter 112, the modulated optical signal is divided into a plurality of optical signals. Each optical signal is applied to an associated one of a plurality of photodiodes 116 through an associated one of a plurality of optical fibers 114 having a constant incremental increase in dispersion for creating constant relative time delays between antenna elements 96. Optical fibers 114 may include additional lengths (as noted in FIG. 3) for antenna remoting purposes; preferably, the dispersion of the remoting fibers are all equal. Each photodiode 116 converts its associated input optical signal into an electrical signal and applies that electrical signal to an associated one of a plurality of transmit/receive (T/R) modules 94.

The T/R module 94 is known in the art, and for this application, would consist of amplifiers 122, two switches 124, and a mixer 126, as shown insert 46 of FIG. 3. For the transmission mode, the switches 124 are set to the upper state (not shown) and the signal from the antenna feed is amplified (possibly several times) before being applied to the antenna element. In the receive mode the switches 124 are set to the lower state (as shown) and the antenna feed signal is mixed in mixer 126 with the receive signal from the antenna element 96. The mixer 126 downconverts the received signal to the IF frequency range and is available via the IF bus connection 95.

For the fiber optic true time-delay array antenna feed system 90 operating in a transmit mode at a frequency $f_m$, the element-dependent time delay produces an effective EMR phase front (time delay) tilt of angle e in the coaxial cable (or waveguide) 92 portion of the system 90. The switches 124 within the T/R module 94 are set so as to allow amplification of the EMR signals by amplifiers 122 within the T/R module 94 in each line 92 before they reach the antenna elements 96 and are transmitted. To change into the receive mode of operation, the EMR frequency is changed to $f_m + f_{IF}$ to achieve an intermediate frequency offset, $f_{IF}$, between the EMR input signal 108 and the incoming (receive) signals. When the incoming EMR wavefront tilt is $-\Theta$, the resulting microwave phasefront in the coaxial cable 92 is tilted in the opposite direction to the incoming phasefront generated by the antenna elements. The T/R module switches 124 are reconfigured to allow the reference signal generated by the optical system and the incoming signal to be mixed and to generate an IF signal. If the receive EMR signal arrives from angle $-\Theta$, the IF signals from all of the mixers 126 are in-phase and generate a maximum sum signal power in the IF combiner 106. The search for a maximum IF sum signal corresponding to the specific received beam angle is carried out by sweeping the tuning voltage 102 to the tunable Laser 98 until $-\Theta$ is reached.

The architecture of the embodiments also lends itself to implementation of more complex radar functions which include formation of multiple beams for sidelobe cancellation and antijam applications. Multiple antenna beams can be generated by sending combined optical signals from multiple tunable lasers and external modulator pairs to the fiber optic splitter. Each of these multiple signals generates a desired independently steerable and independently modulated time-delay array antenna beam. Also, the techniques involved with multiple beam operation also facilitates beam shaping and side-lobe cancellation. Multiple-frequency antenna beams can also be easily generated by simply sending the multiple EMR signals to the external modulator. Further, the tunable optical carrier with EMR signal modulation can be formed by heterodyning (mixing) two tunable lasers with different frequencies equal to the EMR signal frequency. Then the generated continuous-wave signal can be converted to a pulsed signal in an external modulator. Also, each time-delay signal can be used to feed a small sub-array of antenna elements, which can be individually phase modulated since the sub-array aperture is small. In addition, active beam apodization and other adaptive array functions can be accomplished by inserting (low-speed, low cost) intensity modulators in each fiber-optic line or by using variable-response and polarity-reversable photodetectors (e.g., metal-semiconductor-metal photodiodes). (Apodization being the modification of the amplitude transmittance of the aperture of an optical or electrical system so as to determine the energy of the diffraction.)

The embodiments described herein provide a unique and novel way to generate a plurality of identical signals with correlated, continuously variable, relative true time-delays for RF, microwave and millimeter wave signals. Since these embodiments modulate the signals of interest onto an optical signal and then vary the velocity at which the optical signal travels in each signal feed line, a phase shift linearly proportional to the modulation frequency of the signal of interest is produced. The relative time delay is continuously variable, alleviating the problems associated with discrete phase shifters. The extent of the variability of delay is only limited by the optical fiber length, tunability of the optical source and volume reduction over current phase shift methods. An additional advantage gained by the apparatus shown in the preferred embodiments is that control is accomplished by means of a low (0–10 volt) power signal which tunes the wavelength of the source. This minimizes the interface requirements and limits the rate of phase shift only by the rate at which the source can be tuned. The fiber optic true-time delay feed exhibits other desirable features: the system bandwidth is expected to be limited only by the external modulators and photodetectors; and other system parameters are projected to be good—efficiency <15 dB wideband link loss, noise figure <35 dB, and dynamic range >110 dB·Hz$^{1/2}$. Lastly, these embodiments provide for a technique to generate multiple correlated optical signals without mixing free-space optical beams, which requires tight mechanical tolerances and stability (on the scale of an optical wavelength).

The well-known direct connection between antenna array signal processing and finite impulse response filters implies that the embodiments presented here are easily converted to apply to various (adaptive) signal processing systems. Another embodiment of this invention 140, which utilizes a wavelength-controlled optical carrier source 144. The EMR input 146 to be filtered modulates the wavelength-controlled optical carrier in an external modulator 148. The EMR-modulated optical signal is split by fiber optics splitter 151 into many different optical fibers 152 and propagates along each fiber at a velocity determined by the wavelength of the optical carrier source 142 and by the dispersion of the respective fiber. The intensity (weighting) of each optical signal is set by fiber-optic intensity modulators 154 connected in series with each fiber. The plurality of optical signals is recombined in fiber-optic combiner 158 to form a single optical output which is applied to photodetector 161. The electrical signal generated by the photodetector 161 contains the sum of a plurality of relatively time delayed replicas of the EMR input and therefore is a filtered version of the EMR input. The filter function is determined by the weighting controls and relative time delays, which can be set and varied by the wavelength of the source 142. The filtered signal from the photodetector can be amplified by an EMR amplifier 162 and outputted as EMR output 164, thus, a tunable finite impulse response filter is formed. This specification sets forth the preferred embodiments of the fiber optic true time-delay array antenna feed and applications thereof. Other individuals skilled in the art may visualize many other applications for utilizing the invention, but the scope of the invention is as set forth in the claims.

What is claimed is:

1. A fiber optic true time-delay array antenna feed system comprising:

means for generating at least one modulated optical signal having at least one wavelength and containing at least one modulation signal;

means for splitting the modulated optical signal into a plurality of modulated optical signals;

means for respectively propagating the plurality of modulated optical signals at a velocity dependent on the optical wavelength of each of the modulated optical signals comprising the plurality of modulated optical signals thereby producing a plurality of time delayed modulated optical signals;

means for respectively converting the plurality of time delayed modulated optical signals into a plurality of electrical signals;

means for respectively equalizing the nominal time delays of the plurality of electrical signals;

means for respectively amplifying the plurality of nominally equalized electrical signals;

means for transmitting the plurality of nominally equalized electrical signals;

means for receiving a plurality of electromagnetic signals; and, means for respectively amplifying, controlling and mixing the plurality of nominally equalized electrical signals with the plurality of received electromagnetic signals.

2. An antenna feed system, as in claim 1, wherein the means for generating at least one modulated optical signal is further comprised of a means for generating at least one narrow-linewidth wavelength controlled continuous-wave optical carrier; means for controlling the wavelength of the at least one optical carrier; and means for modulating the at least one optical carrier with at least one electrical signal to produce a modulated optical signal.

3. An antenna feed system, as in claim 2, wherein the means for generating at least one narrow-linewidth wavelength controlled continuous-wave optical carrier is comprised of a single means generating a narrow-linewidth wavelength controlled continuous-wave optical carrier.

4. An antenna feed system, as in claim 3, wherein the means for generating a continuous-wave optical carrier is a laser.

5. An antenna feed system, as in claim 4, wherein the laser is a continuously tunable laser.

6. An antenna feed system, as in claim 2, wherein the means for modulating the optical signal with an electrical signal is an external modulator.

7. An antenna feed system, as in claim 6, wherein the external modulator is an optical intensity modulator.

8. An antenna feed system, as in claim 6, wherein the external modulator is an optical frequency modulator.

9. An antenna feed system, as in claim 6, wherein the external modulator is an optical phase modulator.

10. An antenna feed system, as in claim 2, wherein the means for generating at least one narrow-linewidth wavelength controlled continuous-wave optical carrier is further comprised of a plurality of means for generating a narrow-linewidth wavelength controlled continuous-wave optical carrier, means for respectively controlling the plurality of means for generating the narrow-linewidth wavelength controlled continuous-wave optical carrier and a means for combining the plurality of narrow-linewidth wavelength controlled continuous-wave optical carriers so as to form one multiple wavelength optical carrier.

11. An antenna feed system, as in claim 2, wherein the means for modulating the optical carrier with at least one electrical signal is further comprised of a means to combine a plurality of electrical signals so as to form a composite electrical signal.

12. An antenna feed system, as in claim 11, wherein the means to combine a plurality of electrical signals so as to form a composite electrical signal is an electrical power combiner.

13. An antenna feed system, as in claim 10, wherein the means for combining the plurality of narrow-linewidth wavelength controlled continuous-wave optical carriers so as to form one multiple wavelength optical carrier is at least-one fiber optic combiner.

14. An antenna feed system, as in claim 2, wherein the means for controlling the wavelength of the at least one optical carrier is a constant voltage power supply.

15. An antenna feed system, as in claim 2, wherein the means for controlling the wavelength of the at least one optical carrier is an electrical signal generator.

16. An antenna feed system, as in claim 2, wherein the means for controlling the wavelength of the at least one optical carrier is a digital-to-analog converter.

17. An antenna feed system, as in claim 2, wherein the means for controlling the wavelength of the at least one optical carrier is an electrical circuit capable of producing complex electrical waveforms.

18. An antenna feed system, as in claim 1, wherein the means for generating at least one modulated optical signal is further comprised of a means for generating at least one narrow-linewidth wavelength controllable continuous-wave optical carrier; means for controlling the wavelength of the at least one optical carrier; plurality of means for modulating the plurality of optical carriers with at least one electrical signal to produce a plurality of modulated optical signals; and a means to combine the plurality of modulated optical signals so as to form a combined modulated optical signal.

19. An antenna feed system, as in claim 18, wherein the means for generating at least one narrow-linewidth wavelength controlled continuous-wave optical carrier is comprised of a single means generating a narrow-linewidth wavelength controlled continuous-wave optical carrier.

20. An antenna feed system, as in claim 18, wherein the means for modulating the optical signal with an electrical signal is an external modulator.

21. An antenna feed system, as in claim 20, wherein the external modulator is an optical intensity modulator.

22. An antenna feed system, as in claim 20, wherein the external modulator is an optical frequency modulator.

23. An antenna feed system, as in claim 20, wherein the external modulator is an optical phase modulator.

24. An antenna feed system, as in claim 18, wherein the means to combine the plurality of modulated optical signals so as to form a combined modulated optical signal is at least one fiber optic combiner.

25. An antenna feed system, as in claim 18, wherein the means for generating at least one narrow-linewidth wavelength controlled continuous-wave optical carrier is further comprised of a plurality of means for generating a narrow-linewidth wavelength controlled continuous-wave optical carrier, means for respectively controlling the plurality of means for generating the narrow-linewidth wavelength controlled continuous-wave optical carrier and a means for combining the plurality of narrow-linewidth wavelength controlled continuous-wave optical carriers so as to form one multiple wavelength optical carrier.

26. An antenna feed system, as in claim 18, wherein the means for modulating the optical carrier with at least one electrical signal is further comprised of a means to combine a plurality of electrical signals so as to form a composite electrical signal.

27. An antenna feed system, as in claim 25, wherein the means to combine the plurality of narrow-linewidth wavelength controlled continuous-wave optical carriers so as to form one multiple wavelength optical carrier is at least one fiber optic combiner.

28. An antenna feed system as in claim 1, wherein said means for splitting the modulated optical signal into a plurality of modulated optical signals is at least one fiber-optic splitter.

29. An antenna feed system, as in claim 1, wherein each of the plurality of modulated optical signals has a time-delay differing from the time-delay of each of the other optical signals of the plurality of optical signals.

30. An antenna feed system, as in claim 1, wherein the means for respectively propagating the plurality of modulated optical signals respectively is a plurality of optical fibers.

31. An antenna feed system, as in claim 29, wherein the difference in time-delay between each of the plurality of modulated optical signals is formed by each of the plurality of optical fibers respectively propagating the plurality of modulated optical signals having a different net optical dispersion from the net optical dispersion of any other optical fiber within the plurality of optical fibers.

32. An antenna feed system, as in claim 31, wherein the net optical dispersion of each optical fiber is determined by a makeup of different lengths of dispersive and non-dispersive optical fiber calculated to provide a desired wavelength dependence of time delay in that optical fiber.

33. An antenna feed system, as in claim 1, wherein the means for respectively converting the plurality of time delayed modulated optical signals into a plurality of time-delayed electrical signals is an optical intensity sensitive photodetector.

34. An antenna feed system, as in claim 1, wherein the means for respectively converting the plurality of time delayed modulated optical signals into a plurality of time-delayed electrical signals is an optically coherent detection means for converting frequency-modulated optical signals to time-delayed electrical signals.

35. An antenna feed system, as in claim 1, wherein the means for respectively converting the plurality of time delayed modulated optical signals into a plurality of time-delayed electrical signals further comprising a means to convert frequency-modulated optical signals into intensity-modulated optical signals and an optical intensity sensitive photodetection means for converting the intensity modulated optical signals into time-delayed electrical signals.

36. An antenna feed system, as in claim 1, wherein the means for respectively converting the plurality of time delayed modulated optical signals into a plurality of time-delayed electrical signals is a means for converting phase modulated optical signals into intensity-modulated optical signals and an optical intensity sensitive photodetection means for converting the intensity modulated optical signals into time-delayed electrical signals.

37. An antenna feed system, as in claim 1, wherein each of the plurality of combined modulated optical signals has a time-delay from external modulator until conversion to time-delayed electrical signals differing from the time-delay of each of the other modulated optical signals of the plurality of combined modulated optical signals.

38. An antenna feed system, as in claim 1, wherein the means for nominally equalizing the time delay in each time-delayed electrical signal with the time delay of each of the other time-delayed electrical signals of the plurality of time-delayed electrical signals is a plurality of electromagnetic radiation line stretchers.

39. An antenna feed system, as in claim 1, wherein the means for respectively amplifying the plurality of time-delayed electrical signals is a plurality of electrical amplifiers.

40. An antenna feed system, as in claim 1, wherein the means for transmitting said plurality of time-delayed electrical signals is a plurality of elements comprising an array antenna.

41. An antenna feed system, as in claim 1, wherein the means for receiving a plurality of electromagnetic signals is a plurality of elements comprising an array antenna.

42. An antenna feed system, as in claim 1, wherein the means for mixing the equalized electrical signals with a plurality of received electrical signals is an electrical mixer.

43. A fiber optic true time-delay antenna feed system comprising:

an array antenna having a plurality of elements capable of generating at least one beam, each beam controllable in azimuth and elevation and any combination of the azimuth and elevation and producing desired beam shapes in transmit and receive mode and any combination of the transmit and receive mode;

means for generating a first optical carrier containing a narrow-linewidth wavelength controlled continuous-wave optical carrier of which the wavelength is used to control the elevation of the beam produced by the plurality of elements of the array antenna;

means for generating a second optical carrier containing a narrow-linewidth wavelength controlled continuous-wave optical carrier of which the wavelength is used to control the azimuth of the beam produced by the plurality of elements of the array antenna;

means for modulating said first optical carrier with an electrical signal producing a first modulated optical signal;

means for amplifying the first modulated optical signal;

means for splitting the amplified first optical signal into a first plurality of modulated optical signals;

a plurality of optical fibers for respectively propagating said first plurality of modulated optical signals comprised of, optical fibers having a different net optical dispersion from any other optical fiber within the plurality of optical fibers thereby resulting in a different time delay being applied to each of the first plurality of modulated optical signals;

means for respectively converting the plurality of first modulated optical signals into a plurality of first time-delayed electrical signals;

means for amplifying the plurality of time-delayed first electrical signals;

means for amplifying the second optical carrier;

means for splitting the amplified second optical carrier into a column (n) of amplified second optical carriers;

means for respectively modulating the column of amplified second optical carriers with the plurality of first time-delayed electrical signals producing a second plurality of modulated optical signals;

means for respectively splitting each of the plurality of second modulated optical signals into a plurality of rows (m) of modulated optical signals;

a plurality of optical fibers for respectively propagating the plurality of rows and columns of modulated optical signals;

each of said plurality of optical fibers being comprised of optical fibers having a different net optical dispersion from any other optical fiber within the row of optical fibers thereby resulting in a different time delay being applied to each of the plurality of rows and columns of modulated optical signals;

means for respectively converting the plurality of time-delayed rows and columns of modulated optical signals into a plurality of rows and columns of second time-delayed electrical signals;

means for respectively amplifying the plurality of second time-delayed electrical signals for application to the plurality of elements of the array antenna for transmission;

means for receiving a plurality of electromagnetic signals; and, means for mixing the plurality of time-delayed rows and columns of second time-delayed electrical signals with the plurality of received electromagnetic signals.

44. An antenna feed system, as in claim 43, wherein the difference in net optical dispersion of each optical fiber of a plurality of optical fibers is achieved by combining segments of optical fiber having different lengths of dispersive and non-dispersive optical fiber, the length of dispersive and non-dispersive optical fiber being calculated so as to provide a different time delay in the optical signal being propagated by that optical fiber that differs from the time delay of the optical signal being conducted by any other optical fiber of the plurality of optical fibers.

45. An antenna feed system, as in claim 1, wherein the means for respectively amplifying, controlling and mixing the plurality of nominally equalized electrical signals is a plurality of transmit/receive modules.

46. A fiber optic true time-delay finite impulse response filter comprising:

means for generating at least one narrow-linewidth wavelength-controlled continuous-wave optical carrier;

means for combining the optical carrier(s) into a combined optical carrier;

means for combining a first plurality of electrical signals into a combined electrical signal;

means for respectively modulating each of the combined optical carrier(s) with a combined electrical signal to produce a first combined modulated optical signal;

means for splitting the first combined modulated optical signal into a plurality of first combined modulated optical signals;

means for respectively propagating each of said plurality of first combined modulated optical signals at a velocity dependent on the optical wavelength of each of the plurality of first combined modulated optical signals to form a plurality of time-delayed first combined modulated optical signals;

means for combining a plurality of time-delayed first combined modulated optical signals to form a second combined modulated optical signal;

means for respectively converting the second combined modulated optical signal into a second combined electrical signal;

means for independently controlling the wavelength of the optical carriers thereby setting and varying the time delay of the electrical signals from said modulating means to said converting means; and, means for respectively amplifying the second combined electrical signal to produce a filtered output electrical signals.

47. A method for providing a fiber-optic true time-delay array antenna feed comprising the steps of:

generating at least one of narrow-linewidth wavelength-controlled optical carrier;

combine the narrow-linewidth wavelength-controlled optical carrier(s) into an optical signal;

modulate the optical signal with an electromagnetic radiation signal to form a modulated optical signal;

split the modulated optical signal into a plurality of modulated optical signals, each of said modulated optical signals having a time-delay differing from each other modulated optical signal of the plurality of modulated optical signals;

respectively convert the plurality of time-delayed modulated optical signals into a plurality of time-delayed electrical signals; and apply respectively the time-delayed electrical signals to the array antenna.

48. An array antenna system having a fiber optic true time-delay array antenna feed system comprising:

a tunable light source for generating at least one modulated optical signal having at least one wavelength and containing at least one modulation signal;

means for splitting the modulated optical signal into a plurality of modulated optical signals;

a plurality of optical fibers comprised of dispersive and non-dispersive optical fibers of approximately equal length for propagating the plurality of modulated optical signals at a velocity dependent on the optical wavelength of each of the modulated optical signals thereby producing a plurality of time delayed modulated optical signals;

means for respectively converting the plurality of time delayed modulated optical signals into a plurality of electrical signals;

means for respectively equalizing the nominal time delays of the plurality of electrical signals;

means for respectively amplifying the plurality of nominally equalized electrical signals; means for transmitting the plurality of nominally equalized electrical signals;

means for receiving a plurality of electromagnetic signals; and means for respectively amplifying, controlling and mixing the plurality of nominally equalized electrical signals with the plurality of received electromagnetic signals.

49. An array antenna system having a fiber optic true time-delay antenna feed system comprising:

a tunable light source for generating a plurality of narrow-linewidth wavelength-controlled continuous-wave optical carriers;

means for combining the plurality of optical carriers into a combined optical carrier;

means for generating a first plurality of external independent electrical signals;

means for combining the first plurality of external independent electrical signals into a combine electrical signal;

means for modulating the combined optical carrier with the combined electrical signal to produce a first combined modulated optical signal;

means for splitting the first combined modulated optical signal into a plurality of first combined modulated optical signals;

means for propagating each of the plurality of first combined modulated optical signals through an optical fiber comprised of dispersive and non-dispersive optical fibers of approximately an equal length at a velocity dependent on a predetermined wavelength of each of the plurality of first combined modulated optical signals to form a plurality of time-delayed first combined modulated optical signals;

means for combining the plurality of time-delayed first combined modulated optical signals to form a second combined modulated optical signal;

means for converting the second combined modulated optical signal into a second combined electrical signal;

means for independently controlling the wavelength of the optical carriers thereby setting and varying the time-delay of the electrical signals from the modulating means to the converting means; and means for respectively amplifying the second combined electrical signals to produce a filtered output electrical signal.

50. A method for providing a fiber-optic true time-delay array antenna feed comprising the steps of:

generating a plurality of narrow-linewidth wavelength-controlled optical carriers;

combining the plurality of narrow-linewidth wavelength-controlled optical carriers to form a single optical carrier;

generating an electromagnetic signal;

modulating the optical signal with the electromagnetic signal producing a modulated optical signal;

splitting the modulated optical signal into a plurality of modulated optical signals, each of the modulated optical signals having a time-delay differing from each other modulated optical signal;

converting each time-delayed modulated optical signals into a time-delayed electrical signal; and applying each time-delayed electrical signal to an element of an array antenna.

51. A fiber optic true time-delay array antenna feed system comprising:

one or more tunable light sources for generating a plurality of narrow-linewidth wavelength-controlled continuous-wave optical carriers;

one or more electrical signals;

means for modulating at least one optical carrier with at least one electrical signal to form a modulated optical signal;

means for splitting each modulated optical signal into a plurality of modulated optical signals;

a plurality of optical fibers having a different net optical dispersion from the net optical dispersion of any other optical fiber within the plurality of optical fibers determined by a makeup of different lengths of dispersive and non-dispersive optical fiber calculated to provide a desired wavelength dependence on the time delay in that optical fiber for receiving and propagating, respectively, the plurality of modulated optical signals so that each modulated optical signal has a time-delay differing from the time-delay of each of the other modulated optical signals of the plurality of modulated optical signals;

means for respectively converting the plurality of time delayed modulated optical signals into a plurality of electrical signals;

means for equalizing the nominal time delays of the plurality of electrical signals;

means for respectively amplifying the plurality of nominally equalized electrical signals;

means for transmitting the plurality of amplified nominally equalized electrical signals;

means for receiving a plurality of electromagnetic signals; and, means for respectively amplifying, controlling and mixing the plurality of nominally equalized electrical signals with the plurality of nominally equalized electrical signals with the plurality of received electromagnetic signals.

* * * * *

UNITED STATES PATENT AND TRADEMARK OFFICE
CERTIFICATE OF CORRECTION

PATENT NO. : 6,337,660 B1
DATED : January 8, 2002
INVENTOR(S) : Esman et al.

It is certified that error appears in the above-identified patent and that said Letters Patent is hereby corrected as shown below:

<u>Title page,</u>
Item [74], *Attorney, Agent, or Firm,* "John G. Mills" should be corrected to read
-- John Gladstone Mills III --

Signed and Sealed this

Twenty-second Day of June, 2004

JON W. DUDAS
*Acting Director of the United States Patent and Trademark Office*